United States Patent [19]

Howson

[11] 4,412,932

[45] * Nov. 1, 1983

[54] METHOD OF CLEANING FIBREGLASS

[76] Inventor: Barry R. Howson, 21 Rochdale Rd., Mount Claremont, Western Australia, Australia

[ * ] Notice: The portion of the term of this patent subsequent to Apr. 13, 1999, has been disclaimed.

[21] Appl. No.: 337,822

[22] Filed: Jan. 7, 1982

Related U.S. Application Data

[63] Continuation of Ser. No. 208,573, Nov. 20, 1980, Pat. No. 4,324,678.

[30] Foreign Application Priority Data

Nov. 23, 1979 [AU] Australia .............................. PE1455

[51] Int. Cl.[3] ......................... B60S 1/00; B63B 59/00; C11D 7/08; C11D 7/26

[52] U.S. Cl. ........................................ 252/136; 134/3; 134/4; 134/42; 252/142; 252/174.21

[58] Field of Search ........................... 134/3, 41, 42, 4; 252/136, 142; 208/573

[56] References Cited

U.S. PATENT DOCUMENTS

| | | | |
|---|---|---|---|
| 2,396,776 | 3/1946 | Douty | 252/143 |
| 2,868,732 | 1/1959 | Truc | 252/136 |
| 3,173,875 | 3/1965 | Wegst | 252/105 |
| 3,728,267 | 4/1973 | Hirota | 252/142 |
| 4,030,440 | 6/1977 | Wickersham | 114/222 |
| 4,181,622 | 1/1980 | Gavin | 252/143 |
| 4,324,678 | 4/1982 | Howson | 252/136 |

*Primary Examiner*—Dennis L. Albrecht
*Attorney, Agent, or Firm*—Laurence R. Brown

[57] ABSTRACT

Hulls of fibreglass boats often become stained above and below the waterline after a period in the water. The present invention provides a method of cleaning fibreglass which comprises applying to a fibreglass surface a composition comprising an aqueous solution of phosphoric or oxalic acid and letting the solution dry on the fibreglass surface. It has been found that the method of the present invention is a quick and effective way of cleaning fibreglass.

1 Claim, No Drawings

METHOD OF CLEANING FIBREGLASS

This application is a continuation of application Ser. No. 208,573, filed Nov. 20, 1980 now U.S. Pat. No. 4,324,678 granted Apr. 13, 1982.

The present invention relates to a method of cleaning fibreglass. The present invention also relates to a composition for cleaning fibreglass.

Boats are frequently constructed with fibreglass hulls. It has been found that the hulls of such boats become stained above and below the water line after a period in the water. The stain is unsightly and detracts from the aesthetic appeal of the boat. Thus boat owners desire to remove the stain from the fibreglass hull of the boat. In the past the stain has been removed by abrasive means such as by applying a polish to the hull or a compound and scrubbing the hull with a buffing tool. This procedure is extremely tedious and time consuming, it taking for example, some one and a half days to remove the stain from a 20 foot boat.

In accordance with the present invention there is provided a method of cleaning fibreglass which comprises applying to a fibreglass surface a composition comprising an aqueous solution of phosphoric acid or oxalic acid.

The composition preferably contains from about 10% to 55% W/W of the acid. More preferably, the composition contains from about 20% to 50% W/W of the acid such as from about 40% to 50% W/W and in particular from about 40% to 44% W/W. The pH of the composition is preferably in the range from about 0.5 to 2.

The composition also preferably contains a minor amount of a wetting agent particularly a non-ionic detergent such as from about 0.1 to 3.0% by weight, in particular from 0.5 to 2.0% by weight. It has been found, for example, that 1% by weight of I.C.I. Teric LA8 gives satisfactory results. The wetting agent enables the composition to be applied evenly over the fibreglass surface.

Preferably, the composition also contains from 0.1% to 5.0% W/V of particulate ferrous sulphate or ferrous ammonium sulphate expressed as $FeSO_4$ such as from 0.25% to 1% W/V.

A particularly useful concentration is 0.6 kg per 100 liters. The composition may be applied by means of a brush to form a layer on the fibreglass surface. There is no need to hose off the composition after it has dried.

It has been found that application of the composition in accordance with the method of the present invention can be effected quite quickly and that the stain on a boat hull disappears in a short period of time.

While the method of the present invention has been described with particular reference to cleaning of boat hulls it is to be understood that it is of general applicability to cleaning of fibreglass.

The method of the present invention has the advantage that it has little or no effect on the fibreglass surface either chemically and structurally.

As an example of the method of the present invention, an aqueous composition containing about 40% W/W phosphoric acid, about 0.6% ferrous sulphate and 1% by weight of I.C.I. Teric LA8, was applied by brush to a stained 7.5 meter fibreglass boat hull. The composition had a specific gravity of about 1.27 and a pH of 0.7.

A single coat was applied and this took about 45 minutes. It was found that within 2 minutes of application of the composition the stain was removed. Further, there was no need to wash off the applied composition.

Modifications and variations such as would be apparent to a skilled addressee are deemed within the scope of the present invention.

We claim:

1. A method of cleaning stains from fibreglass by simply applying a chemical solution without the necessity of scrubbing or removing the residue by washing it off, or the like, which consists of the single step of applying to a fibreglass surface an aqueous solution consisting of (1) water, (2) about 0.25% to 1.0% by weight of a particulate material of the group consisting of ferrous sulphate and ferrous ammonium sulphate expressed as $FeSO_4$, (3) acid of a pH between 0.5 and 2 containing 20 to 55 percent W/W of acid from the group consisting of phosphoric and oxalic acid and (4) 0.1 to 3 percent by weight of a non-ionic detergent, and letting the solution dry on the fibreglass surface without washing off.

* * * * *